United States Patent [19]

Giannini et al.

[11] 4,107,416

[45] Aug. 15, 1978

[54] COMPONENTS OF CATALYSTS FOR USE IN POLYMERIZING AND CATALYSTS PREPARED THEREFROM

[75] Inventors: Umberto Giannini, Milan; Enrico Albizzati, Arona (Novara); Sandro Parodi, Oleggio (Novara), all of Italy

[73] Assignee: Montedison S.p.A., Milan, Italy

[21] Appl. No.: 703,546

[22] Filed: Jul. 8, 1976

[30] Foreign Application Priority Data

Jul. 9, 1975 [IT] Italy ............... 25217 A/75

[51] Int. Cl.² .................. C08F 4/02; C08F 10/00
[52] U.S. Cl. .................... 526/114; 252/429 B; 252/429 C; 260/448 A; 526/124; 526/125; 526/159; 526/164; 526/165; 526/169; 526/169.1; 526/351; 526/352; 526/906
[58] Field of Search ........... 252/429 A, 429 B, 429 C, 252/431 R; 526/114, 105, 125, 159, 160, 161, 163, 164, 165, 169

[56] References Cited

U.S. PATENT DOCUMENTS

| | | | |
|---|---|---|---|
| 3,081,286 | 3/1963 | McKennis | 526/105 |
| 3,113,115 | 12/1963 | Ziegler et al. | 526/163 |
| 3,324,095 | 6/1967 | Canick et al. | 526/127 |
| 3,450,682 | 6/1969 | Sasaki et al. | 526/122 |
| 3,642,746 | 2/1972 | Kashiwa et al. | 526/125 |
| 3,784,539 | 1/1974 | Ort | 526/153 |
| 3,989,881 | 11/1976 | Yamaguchi et al. | 526/125 |

FOREIGN PATENT DOCUMENTS 237,048 1/1961 Australia.
1,314,258 4/1973 United Kingdom.

Primary Examiner—Edward J. Smith

[57] ABSTRACT

There are disclosed new starting components for use in preparing catalysts for the polymerization and copolymerization of olefins. The new starting components are compounds having the general formulae $R_2AlOR''$ and/or $RAl(OR'')_2$, in which R represents alkyl radicals containing 1 to 12 carbon atoms and R'' has one of the following structures:

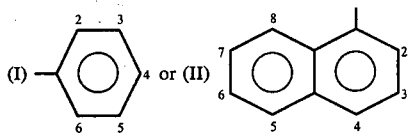

7 Claims, No Drawings

COMPONENTS OF CATALYSTS FOR USE IN POLYMERIZING AND CATALYSTS PREPARED THEREFROM

THE PRIOR ART

It is known to polymerize ethylene and alpha-olefins to high polymer yields in contact with catalysts prepared from transition metal salts and organometallic compounds of metals belonging to Groups I to III inclusive of the Mendelyeev Periodic Table, and preferably from such catalysts prepared from the transition metal salts and organometallic compounds of aluminum.

It is also known to polymerize ethylene and alphaolefins to high polymer yields in contact with catalysts prepared from organometallic compounds of metals belonging to Groups I–III inclusive of the Mendelyeev Periodic Table, perferably such compounds of aluminum, and the products obtained by contacting a titanium compound with a magnesium compound in an active state.

Although the organometallic compounds of aluminum used as one component in preparing the known catalysts have been, in practice and for the most part, the Al trialkyls and dialkyl Al halides, organometallic compounds of Al of the type $R_2AlOR'$ or $RAl(OR')_2$ have been mentioned generically. However, the catalysts obtained from such compounds as $R_2AlOR'$ as the organometallic component are either wholly inactive in the polymerization of olefins or exhibit low activity only at high temperatures above 100° C.

Examples of such Al compounds of that type, $R_2AlOR'$, are those in which R' is an alkyl radical such as methyl, ethyl, propyl, etc., or an aryl radical such as phenyl.

Organometallic compounds of Al of the formula $RAl(OR')_2$ yield catalysts which are quite inactive in the polymerization of olefins, even at high temperatures.

THE PRESENT INVENTION

An object of the present invention was to provide new catalyst-forming components having the formula $R_2AlOR''$ and/or $RAl(OR'')_2$ which, with transition metal compounds, yield catalysts which are highly active in the polymerization and copolymerization of olefins.

This and other objects are achieved by the present invention in accordance with which we have found it possible to obtain catalysts one starting component of which corresponds to the formula $R_2AlOR''$ and/or $RAl(OR'')_2$, provided that the radical R'' is suitably selected and corresponds to one of the following structures:

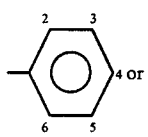
(I)

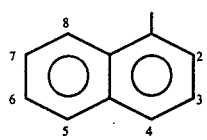
(II)

Surprisingly, we have found that when R'' in the compounds $R_2AlOR''$ and/or $RAl(OR'')_2$ corresponds to formulae I or II, and R is an alkyl group containing from 1 to 12 carbon atoms, inclusive, the catalyst resulting from the combination of the compounds $R_2AlOR''$ and/or $RAl(OR'')_2$ with transition metal compounds, exhibit an activity in the polymerization and copolymerization of olefins, and in particular of ethylene and-/or alpha-olefins, which is similar to that of the catalysts prepared from Al trialkyls at the temperatures normally used in commercial operations.

In the $R_2AlOR''$ and $RAl(OR'')_2$ in which R'' has structure (I) or (II), there are present, in positions 2 and 6 in structure (I) and in position 2, and optionally also in position 8, in structure (II), radicals at least one which is capable of providing a steric hindrance higher than that of the group $—C_2H_5$ and, when the radicals in said two positions are different, the other radical being an alkyl radical such as methyl, ethyl, propyl and the like, or an aryl radical such as phenyl.

The radicals which exhibit a steric hindrance higher than that of $—C_2H_5$ present in either one or both of the two positions mentioned, are generally alkyl radicals and preferably branched alkyls containing 3 or more carbon atoms. Examples of such radicals are: $—iC_3H_7$; $—n.C_4H_9$; $—t.C_4H_9$, isoamyl, neopentyl, and the like.

Other examples of radicals which exert steric hindrance, and which may be present in particular in positions 2 and/or 6 of structure (I) are those corresponding to the following formula:

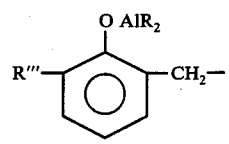

in which R has the same meaning as indicated above and R''' is a radical which exerts a steric hindrance higher than $—C_2H_5$.

Atoms or groups which are not reactive with the alkyl Al compounds may be present as substituents in positions 3, 4 and 5 of structure (I) and in positions, 3, 4, 5, 6 and 7 of structure (II). Examples of such substituents include halogen atoms and alkyl, aryl, alkaryl and aralkyl groups.

In particular, the substituent in position 4 of structure (I) may consist of the group

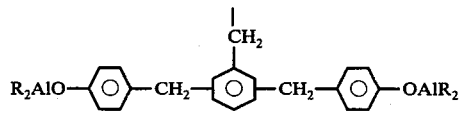

in which R has the same meaning as indicated above.

The compounds $R_2AlOR''$ can be prepared by known methods, starting from compounds $AlR_3$ and R''OH, which generally react according to the following reaction:

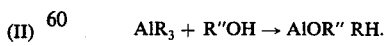

The reaction can be carried out in a hydrocarbon solvent at room temperature or higher.

Another method of preparing the compounds $R_2AlOR''$ consists in reacting $AlR_3$ with $Al(OR'')_3$ according to the following stoichiometry:

and at room temperature or higher.

The compounds RAl(OR")$_2$ can also be prepared by known methods, according to any of the following reactions:

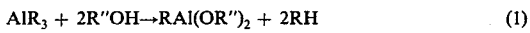
AlR$_3$ + 2R"OH → RAl(OR")$_2$ + 2RH     (1)

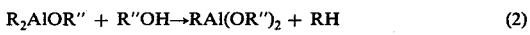
R$_2$AlOR" + R"OH → RAl(OR")$_2$ + RH    (2)

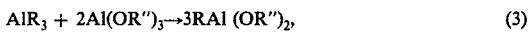
AlR$_3$ + 2Al(OR")$_3$ → 3RAl(OR")$_2$,   (3)

and at room temperature or above.

As already indicated, the final catalysts of the invention are prepared from starting components which comprise (A) the new catalyst-forming components which are the compounds R$_2$AlOR" or RAl(OR")$_2$ as defined herein and (B) compounds of transition metals.

Such final catalysts are active in the polymerization of olefins, in particular of ethylene and/or alpha-olefins of the formula CH$_2$ = CHR, in which R is a radical containing from 1 to 6 carbon atoms, such as propylene, butene-1, 1-methylpentene, and the like.

When the monomer to be polymerized is propylene, and in order to increase the stereospecificity of the catalyst, the organometallic Al compounds, R$_2$Al(OR") and RAl(OR")$_2$ can be partially complexed with electron-donor compounds as described, for example, in the pending appl. Ser. No. 503,765 of Giannini, 6/9/74 now abandoned.

Catalyst-forming components (B) comprise transition metal compounds such as halogenated Ti compounds, e.g., TiCl$_4$, TiBr$_4$, 3TiCl$_3$.AlCl$_3$, Ti halo-alcoholates, etc., Ti alcoholates; vanadium or zirconium halides such as VCl$_4$, VOCl$_3$, ZrCl$_4$, etc., and similar transition metal compounds; or complexes of the formula

M$_m$M'X$_{2m}$Y.nE     (III)

in which
M = Mg, Mn and/or Ca;
m = a number from 0.5 to 2.0, inclusive;
M' = Ti, V and/or Zr;
X = Cl, Br or I;
Y = one or more atoms or groups, either the same or different, selected from halogen atoms, halogen atoms and, contemporaneously, oxygen atoms, —NR$_2$, —OR, —Sr,

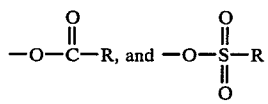
$$-O-\overset{\overset{O}{\|}}{C}-R, \text{ and } -O-\overset{\overset{O}{\|}}{\underset{\underset{O}{\|}}{S}}-R$$

groups, in which R is a hydrocarbon radical, in particular an alkyl, aryl, cycloalkyl or aralkyl radical; acetylacetonate anion; acetylacetonate anion and, contemporaneously, oxygen atoms; such atoms or groups being present in an amount sufficient to satisfy the valency of M';
n = is a number from 0.5m to 20m, inclusive; and
E = an electron-donor compound selected from the following classes of compounds:
(a) esters of organic carboxylic acids;
(b) alcohols;
(c) esters;
(d) amines;
(e) esters of carbonic acid;
(f) nitriles; and
(g) esters of phosphoric and phosphorous acid and phosphorous oxychloride.

In formula (III), a part of the Ti, V and/or Zr may be substituted by Al in such amount that the atomic ratio between Al and the other metals is from 0.1:1 to 2:1, inclusive.

Such complexes and the method of preparing them are described in the pending application of U. Giannini, E. Albizzati, S. Parodi and F. Pirinoli, Ser. No. 670,951, filed Mar. 26, 1976.

As catalyst-forming components (B) comprising compounds of the transition metals, it is possible to employ, also, solid products containing, besides the transition metal, also magnesium and a halogen, selected from chlorine and bromine, and characterized at least either by a surface area larger than 3 m$^2$/g or by an X-rays spectrum showing a halo, the intensity peak of which is at a lattic distance d comprised between 2.43 and 3.20 Å, when chlorine is contained in the catalyst component in a Cl/Mg ratio ≧1; conversely, when the catalyst component contains bromine in a Br/Mg ratio ≧1, the halo is at a distance d comprised between 2.80 and 3.25 Å.

The catalyst components containing a transition metal, magnesium and a halogen (chlorine and/or bromine) can be prepared according to various methods. A preferred method consists in subjecting a mixture comprising a transition metal and anhydrous magnesium chloride or bromide to a grinding treatment, at least until the surface area becomes larger than 3 m$^2$/g or until there appears, in the X-ray spectrum of the ground product, a halo, the intensity peak of which is in one of the ranges specified above.

Alternatively, the catalyst components containing the transition metal, magnesium and the halogen may be prepared by reacting a liquid halogenated compound of the transition metal with a magnesium oxygenated compound such as, for instance, MgO, Mg(OH)Cl, magnesium carbonate, or MgX(OR), in which X is halogen and R is an alkyl or aryl radical containing from 1 to 15 carbon atoms, inclusive. The reaction may be conducted either in the presence or absence of an inert hydrocarbon diluent, at a temperature generally ranging from 20° to 150° C.

The catalytic component (B) containing the transition metal may be prepared, also, by reacting a liquid halogenated compound of the transition metal with a magnesium complex of the type MgX$_2$.nD, in which X is chlorine or bromine, D is a molecule of water, of an alcohol or of an electron-donor compound selected, for instance, from ethers, amines, esters, nitriles and other analogous compounds. In this embodiment, the reaction is conducted in the presence of an excess of the transition metal compound.

In all these preparations, it is preferable to employ, as compounds of the transition metals, halogenated compounds of titanium, vanadium or zirconium, selected in particular from amongst TiCl$_3$, TiCl$_4$, VCl$_4$, VOCl$_3$, halo-alcoholates of titanium, ZrCl$_4$ and other similar compounds.

Use of compounds of the type R$_2$AlOR" or RAl(OR")$_2$ as component (A) of the catalysts has the following advantages over the use of the Al trialkyls as catalyst-forming components:

(1) the compounds according to this invention are less reactive than the aluminum trialkyls towards oxygen, and therefore they are less hazardous since, unlike the Al trialkyls, they are not flammable;

(2) compound R"OH, preferably employed for preparing $R_2AlOR"$ or $RAl(OR")_2$, may be a phenolic antioxidizing agent, of the type generally added as additive to the polymer, after it is dried and before the drawing process (extrusion, granulation), in the commercial process for producing polyolefins. The last-mentioned operation permits an intimate contact of the polymer with the additive so as to enable it to efficaciously exert its stabilizing action.

(3) in the most up-to-date plants for polymerizing olefins, the tendency is to obtain the polymer in the form of spheric or spheroidal particles during the polymerization, in which forms the polymer can be directly utilized by the users, without expensive drawing and pelletizing operations. In this case, however, it becomes rather difficult to mix the stabilizing agent as intimately with the polymer as is necessary to attain a satisfactory stabilization.

When a compound of the type $R_2AlOR"$ or $RAl(OR")_2$ is used as the organometallic component of the catalyst, in accordance with this invention, then on deactivation of the catalyst at the conclusion of the polymerization, for example by means of steam, the compound R"OH, that has formed by hydrolysis of the aluminum organometallic compound remains intimately mixed with the polymer, and is thus able to, and capable of efficiently exerting its stabilizing action;

(4) in the polymerization of olefins in the gas phase, that is generally conducted according to the fluid bed technique, it is absolutely necessary to repeatedly convey an intense olefins' flow through the fluid bed, in order to remove the heat of reaction, to feed the monomer and to get a good fluidization. It is necessary, therefore, to continuously replace the aluminum organometallic compounds that take part in the catalysis and exhibit a generally not negligible vapor tension at the polymerization temperature, wherefore such compounds are entrained by the fluidizing gas stream. The accumulation of conventional aluminum organometallic compounds in the gas recycling circuit is furthermore a source of hazard due to their inflammability. The utilization of organometallic compounds of the type $R_2AlOR"$ or $RAl(OR")_2$ entirely removes such drawback, as these compounds are generally in the solid state and exhibit a practically negligible vapor tension;

(5) finally, the use of solid organometallic compounds of aluminum of the type $R_2AlOR"$ or $RAl(OR")_2$ as catalyst-forming component in accordance with the present invention prevents, during the polymerization of olefins in the gas phase, the caking of polymer particles due to tackiness caused by the presence of the aluminum alkyl compounds used conventionally and which are liquid under the polymerization conditions.

The polymerization of olefins, and especially of ethylene and/or alpha-olefins, with the catalysts prepared, according to this invention, from compounds of the type $R_2AlOR"$ or $RAl(OR")_2$, is generally conducted according to known methods, by operating in a gas phase or in a liquid phase, either in the presence or absence of an inert hydrocarbon diluent.

The polymerization temperature is generally comprised between 0° and 120° C, preferably between 50° and 90° C.

The Al/transition metal ratio may vary over a wide range. In general it is preferable to operate with the ratio of from 5 to 100,000, inclusive.

The following examples are given to illustrate the invention in more detail and are not intended to be limiting.

EXAMPLE 1

14 ml of Al $(C_2H_5)_3$ (100 m. moles) were dissolved in 25 ml of anhydrous and deaerated n-heptane; a solution of 22 g (100 m. moles) of 2,6-ditert. butyl-paracresol were dropped in 2 hours into the solution obtained. The solution was then heated to 90° C until conclusion of the reaction, thus obtaining an 1 M. solution of $(C_2H_5)_2$ Al-(2,6-di-ter. butyl-paracresoxy).

A catalyst-forming component (B) was prepared by co-grinding $Cl_3TiCOH_3$ and anhydrous $MgCl_2$ in a steel ball mill and in such a ratio as to have a titanium content of 5.3% by weight; on X-rays examination, the co-ground product was found to give a spectrum with a halo having its intensity peak at a lattice distance comprised between 2.43 and 3.20 Å.

22.6 mg of the coground product were introduced, along with 8 ml of the solution containing the aluminum compound and 1000 ml of anhydrous and desulphurized n-heptane, into a stainless steel polymerization autoclave having a capacity of 3 liters equipped with an anchor stirrer and heated to 85° C.

Hydrogen (7 atm.) and ethylene (6 atm.) were introduced into the autoclave until a total pressure of 13 atm. was reached and which was kept constant during the polymerization by feeding ethylene continuously.

Polymerization was stopped after 4 hours, the polymer produced was separated by filtration and dried, to obtain 230 g of polyethylene (194,000 g of polymer/g of titanium), having an inherent viscosity of 1.6 dl/g.

The test was repeated using 18 mg of catalytic component containing titanium and magnesium and 8 m. moles of a solution in n-heptane of $(C_2H_5)_2ALOC_6H_5$ as co-catalyst: in this case only traces of polyethylene were obtained. This proves that catalytic components of the type $R_2AlOR"$, in which R" is a phenyl radical that in positions 2 and/or 6 does not carry substituents with steric hindrance higher than that of $-C_2H_5$, are practically inactive.

EXAMPLE 2

Example 1 was repeated using, as catalyst-forming, component (B), 24 mg of the product prepared by dry cogrinding, in a steel ball mill, $TiCl_4$ and anhydrous $MgCl_2$ in such a ratio as to have a titanium content of 3.9% by weight. In this way, 390 g of polyethylene (420,000 g of polymer/g of titanium), having an inherent viscosity of 1.55 dl/g, were obtained.

EXAMPLE 3

Example 2 was repeated, using 9.4 mg of the catalyst-forming component (B) and starting from a gaseous mixture consisting of 9 atm. of ethylene and 4 atm. of hydrogen. 280 g of polyethylene (760,000 g of polymer/g of titanium), having an inherent viscosity of 2.55 dl/g, were obtained.

By way of comparison, a compound of the type $(C_2H_5)_2AlOR"$, in which R" is

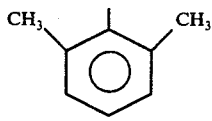

(2–6 dimethylphenyl) was prepared and used as catalyst-forming component (A).

To this purpose, 1.22 g of 2,6-dimethylphenol (10 m. moles), dissolved in 20 ml of n-heptane, were dropped into 1.4 ml of Al(C$_2$H$_5$)$_3$ (10 m. moles). It was then heated to 80° C until conclusion of the reaction.

Example 3 was repeated using 20 mg of the catalytic component containing titanium and magnesium, and the solution of compound R$_2$ALOR″ in which R″ is 2,6-dimethylphenyl prepared as above. In this run however, only 2 g of polyetylene were obtained.

Also, by way of comparison, a compound of the type (C$_2$H$_5$)$_2$ALOR″, in which R″ is

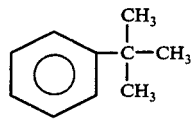

(2-tert.butyl-phenyl) was prepared and used as catalyst-forming component (A).

To this purpose, 1.53 ml (10 m. moles) of 2-tert. butyl-.phenol, diluted with n-heptane to 20 ml, were dropped into 1.4 ml of Al(C$_2$H$_5$)$_3$ (10 m. moles). The mass was heated to 80° C until conclusion of the reaction. Example 3 was repeated, using 16 mg of the catalyst-forming component containing titanium and magnesium, and the solution of compound R$_2$ALOR″ in which R″ is 2-tert-.butylphenyl obtained as indicated herein. Only 3.5 g of polyethylene were obtained.

These two comparative tests unequivocally confirm that, when in position 2 and/or 6 of radicals R″ of compounds of the type R$_2$ALOR″

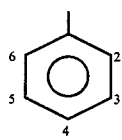

at least one substituent group with steric hindrance higher than that of the group —C$_2$H$_5$ is not present, and both positions 2 and 6 are not substituted, the catalysts obtained therefrom are practically inefficient.

EXAMPLE 4

TiCl$_4$-ethylbenzoate and anhydrous MgCl$_2$ were dry coground in such a ratio as to have a titanium content of 5% by weight. On X-rays examination, the coground product had a spectrum similar to that of the catalytic component of Example 1.

99.4 Mg of the coground product were introduced, along with 6 ml of the solution of (C$_2$H$_5$)$_2$Al-(2,6-di-ter.-butyl-paracresoxy), prepared according to Example 1, and with 350 ml of desulphurized anhydrous n-heptane, into a polymerization autoclave, made of stainless steel, having a capacity of 1000 ml, equipped with an anchor stirrer and heated to 60° C, into which 0.15 atm. of hydrogen had been previously introduced. Subsequently, propylene was fed to the autoclave until a total pressure of 5 atm. was reached and which was kept constant for the duration of the polymerization, by feeding propylene continuously. After 2 hours and 30 minutes, the polymerization reaction was stopped. The polypropylene thus obtained was isolated by treatment of the polymerization reaction mass with methanol and acetone. It amounted to 435 g (88,000 g of polymer/g of titanium). The polymer exhibited an inherent viscosity of 1.67 dl/g and, on extraction with boiling heptane, (36 hours in a Kumagawa apparatus) left a heptane insoluble (isotactic) residue of 54.5%.

EXAMPLE 5

6 ml of a solution of (C$_2$H$_5$)$_2$Al-(2,6-di-ter.butyl-paracresoxy), prepared as in Example 1, was diluted to 50 ml with n-heptane and reacted with 162 mg of ethyl para-anisate for 10 minutes at 25° C. Using 97 mg of a catalyst forming component containing titanium and magnesium as in Example 4, and the solution of (C$_2$H$_5$)$_2$Al-(2,6-di-ter.butyl-paracresoxy) as co-catalyst, after a 5-hour polymerization under the conditions of Example 4, 105 g of polypropylene (22,000 g of polymer/g of titanium), having an inherent viscosity of 2.13 dl/g and a residue, on extraction with heptane, of 89.6%, were obtained.

EXAMPLE 6

A solution of 11 g (50 moles) of 2,6 di-ter.butylparacresol in 60 ml of anhydrous deaerated n-heptane was dropped into 12,6 ml (50 m. moles) of Al(iso-C$_4$H$_9$)$_3$ in 2 hours. After heating at 90° C until conclusion of the reaction, a 0.8 M solution of (iso-C$_4$H$_9$)$_2$Al-(2,6-di-ter.-butyl-paracresoxy) was thus obtained.

Example 4 was repeated, employing 47.4 mg of the catalyst-forming component containing titanium and magnesium, and 7 ml of the solution of compound (iso-C$_4$H$_9$)$_2$Al-(2,6-di-ter.butyl-paracresoxy) as co-catalyst. After a 5-hour polymerization at 80° C, 61 g of polypropylene (26,000 g of polymer/g of titanium), having an inherent viscosity of 1.11 dl/g and a residue, on extraction with heptane, of 70.5% were obtained.

EXAMPLE 7

A stainless steel autoclave having a capacity of 3000 ml, equipped with an anchor stirrer, was fed with about 50 g of thoroughly dry polypropylene in powder form, along with 5 mg of a catalyst-forming component prepared by dry cogrinding TiCl$_4$ and anhydrous MgCl$_2$ in such a ratio as to have a titanium content of 3.9% by weight, along with 8 m. moles of a solution of (C$_2$H$_5$)$_2$Al-(2,6-di-ter.butyl-paracresoxy), prepared as in Example 1 and diluted to 50 ml with n-heptane. After having evaporated to solvent by heating to 80° C, 0.5 atm. of hydrogen and ethylene were introduced into the autoclave, until a total pressure of 15 atm. was reached. The pressure was kept constant for the duration of the polymerization by feeding ethylene continuously. Polymerization was stopped after 2 hours and 100 g of polyethylene (500,000 g of polymer/g of titanium) were obtained.

EXAMPLE 8

1.39 ml of Al(C$_2$H$_5$)$_3$ (10 m. moles) were dissolved in 22 ml of anhydrous deaerated n-heptane, and a solution of 1.78 g (10 m. moles) of 2-tert. butyl-4,6-dimethyl phenol in 27 ml of n-heptane was dropped in over a period of 1 hour. The mass was then heated at 80° C until the reaction was concluded.

Example 3 was repeated, using 20 mg of the catalyst-forming component (B) and, as component (A) or cocatalyst, the foregoing solution. 98 g of polyethylene (125,000 g of polymer/g of titanium) were thus obtained.

EXAMPLE 9

2 g (10 m. moles) of 2,6-di-tert. butyl phenol, dissolved in 50 ml of n-heptane, were dropped into 1.4 ml of Al(C$_2$H$_5$)$_3$ (10 m. moles) diluted to 20 ml with anhydrous and deaerated n-heptane, and the resulting solution was heated at 80° C until conclusion of the reaction.

Example 3 was repeated, employing 21 mg of the catalyst-forming component (B) and the solution described hereinbefore as co-catalyst. 240 g of polyethylene (288,000 g of polymer/g of titanium) were obtained.

EXAMPLE 10

20 m. moles of 2,6-di-ter. butyl-paracresol, dissolved in 20 ml of anhydrous deaerated n-heptane, were dropped into 20 ml of a solution prepared according to Example 1 (containing (C$_2$H$_5$)$_2$Al-(2,6-di-ter. butylparacresoxy). The whole was diluted to 100 ml with n-heptane and heated to 90° C until conclusion of the reaction, thus obtaining a compound of the type (RAl-(OR")$_2$ and, more particularly, RAl(2,6-di-ter. butylparacresoxy)$_2$.

Example 3 was repeated, employing 19 mg of catalyst-forming component (B) and 80 ml of the foregoing solution as cocatalyst. In this way, 60 g of polyethylene (81,000 g of polymer/g of titanium) were obtained.

What we claim is:

1. Catalysts for polymerizing olefins, prepared from the catalyst-forming components
   (A) at least one organometallic compound of Al selected from the group consisting of R$_2$AlOR" and RAl(OR")$_2$ in which R is an alkyl group containing from 1 to 12 carbon atoms inclusive, and R" corresponds to one of the following structures

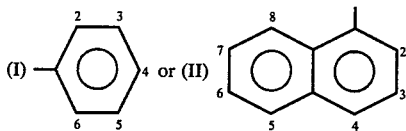

wherein in positions 2 and 6 in structure (I) and position 2, optionally also in position 8, in structure (II) there are present radicals selected from the group consisting of alkyl, aryl and alkylaryl radicals at least one of which exerts a steric hindrance higher than that of the group —C$_2$H$_5$, and
   (B) a complex of a transition metal having the formula:

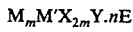

wherein:
   M is Mg, Mn and/or Ca;
   m is a number from 0.5 to 2, inclusive;
   M' is Ti, V and/or Zr;
   X is Cl, Br or I;
   Y is one or more atoms or groups, the same or different, and selected from the group consisting of halogen atoms, halogen atoms and, contemporaneously, oxygen atoms; —NR$_2$, —OR, —SR,

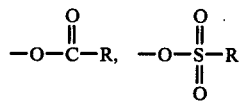

groups in which R is a hydrocarbon radical; acetylacetonate anion, acetylacetonate anion and, contemporaneously oxygen atoms; such groups or atoms being present in an amount to satisfy the valence of M';
   n is a number from 0.5 m to 20 m, inclusive;
   E is an electron-donor compound selected from the group consisting of
   (a) esters of organic carboxylic acids;
   (b) alcohols;
   (c) ethers;
   (d) amines;
   (e) esters of carbonic acid;
   (f) nitriles; and
   (g) phosphorous oxychloride and esters of phosphorous acid.

2. Catalysts for polymerizing olefins according to claim 1, further characterized in that in the groups —NR$_2$, —OR, —SR,

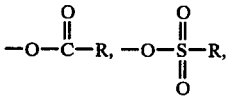

R is an alkyl, aryl, cycloalkyl or aralkyl radical.

3. Process for polymerizing ethylene, alpha-olefins, or mixtures thereof, which comprises polymerizing the olefin or olefin mixture in contact with a catalyst according to claim 1.

4. Process according to claim 3, in which the olefin polymerized is propylene.

5. Process according to claim 3, in which the polymerization of the olefins is carried out in the gas phase.

6. Catalysts for polymerizing olefins prepared from the catalyst-forming components:
   (A) at least one organometallic compound of Al selected from the group consisting of R$_2$AlOR" and RAl(OR")$_2$ in which R is an alkyl group containing from 1 to 12 carbon atoms inclusive, and R" corresponds to one of the following structures

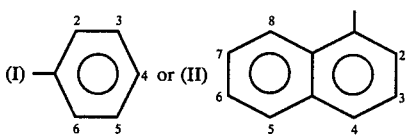

wherein in positions 2 and 6 in structure (I) and position 2, optionally also in position 8, in structure (II) there are present radicals selected from the group consisting of alkyl, aryl and alkylaryl radicals at least one of which exerts a steric hindrance higher than that of the group —C$_2$H$_5$, and
   (B) a solid component consisting of a transition metal, magnesium and a halogen selected from the group consisting of chlorine and bromine, said component being characterized in having a surface area higher than 3 m$^2$/g and/or in having an X-rays spectrum comprising a halo the intensity peak of which is at a lattice distance $d$ comprised between 2.43 Å and 3.20 Å when the halogen is chlorine and present in said catalyst-forming component in a Cl/Mg ratio $\geq 1$, and between 2.80 Å and 3.25 Å when the halogen is bromine and present in said catalyst-forming component in a Br/Mg ratio $\geq 1$.

7. Catalysts for polymerizing olefins according to claim 6, further characterized in that, in component (B) the transition metal is Ti, V or Zr.

* * * * *

UNITED STATES PATENT OFFICE
CERTIFICATE OF CORRECTION

Patent No. 4,107,416          Dated August 15, 1978

Inventor(s) Umberto GIANNINI et al

It is certified that error appears in the above-identified patent and that said Letters Patent are hereby corrected as shown below:

Col. 2 - line 13      Insert - - - of - - - between "one" and "which".

Col. 4 - line 18      "lattic" should be - - - lattice - - -.

Col. 8 - line 10 of Example 7

The word "to" after "evaporated"

should be - - - the - - -.

UNITED STATES PATENT OFFICE
CERTIFICATE OF CORRECTION

Patent No. 4,107,416     Dated August 15, 1978

Inventor(s) Umberto GIANNINI et al

It is certified that error appears in the above-identified patent and that said Letters Patent are hereby corrected as shown below:

Col. 3 - Line 29

"Giannini 6/9/74" as printed should be

- - - Giannini et al, filed

September 6, 1974 - - -.

Signed and Sealed this

Twenty-seventh Day of May 1980

[SEAL]

Attest:

SIDNEY A. DIAMOND

Attesting Officer     Commissioner of Patents and Trademarks